US006375736B1

(12) United States Patent
Lovelace

(10) Patent No.: US 6,375,736 B1
(45) Date of Patent: Apr. 23, 2002

(54) STRUCTURE CELLULAR GROUT

(76) Inventor: Clive Michael Lovelace, 50 Rydal Gardens, Hounslow, Middlesex TW3 2JH (GB)

(*) Notice: Subject to any disclaimer, the term of this patent is extended or adjusted under 35 U.S.C. 154(b) by 0 days.

(21) Appl. No.: 09/880,012

(22) Filed: Jun. 14, 2001

Related U.S. Application Data

(63) Continuation-in-part of application No. 09/103,685, filed on Jun. 10, 1998.

(30) Foreign Application Priority Data

Jul. 21, 1997 (GB) ............................... 9715363
Jan. 6, 1998 (GB) ............................... 9800094

(51) Int. Cl.$^7$ ............................... C04B 18/00

(52) U.S. Cl. ................... 106/672; 106/677; 106/679; 106/709; 106/DIG. 1; 106/DIG. 7

(58) Field of Search ................ 106/705, 709, 106/672, 679, 677, DIG. 1, DIG. 7

(56) References Cited

U.S. PATENT DOCUMENTS

| 3,788,081 A | * | 1/1974 | Sarkisian et al. |
| 4,268,318 A | * | 5/1981 | Wills, Jr. |
| 5,728,209 A | * | 3/1998 | Bury et al. ................. 106/819 |
| 5,776,244 A | * | 7/1998 | Ahrens ........................ 106/737 |
| 5,921,707 A | * | 7/1999 | Owen .......................... 404/75 |
| 5,968,257 A | * | 10/1999 | Ahrens |
| 6,046,374 A | * | 4/2000 | Stephens ........................ 588/3 |

* cited by examiner

Primary Examiner—Paul Marcantoni
(74) Attorney, Agent, or Firm—Stephen Christopher Swift; Swift Law Office

(57) ABSTRACT

A structural cellular grout, formed by combining grout and raw unprocessed road planings. The grout is formed by combining cement, pulverized fuel ash, and a liquid. The liquid comprises water and accelerating admixtures, retarding admixtures, water reducing or water proofing admixtures, and/or superplasticizers. The road planings are produced by grinding the surface of a road. A hardened mixture having a cellular structure is formed, without the use of a foaming agent, compaction, or agitation by mechanical equipment.

13 Claims, No Drawings

STRUCTURE CELLULAR GROUT

CROSS REFERENCE TO RELATED APPLICATIONS

This application is a Continuation-In-Part of Utility patent application Ser. No. 09/103,685, filed Jun. 10, 1998, which was based on United Kingdom Patent Applications 9715363.1 filed on Jul. 21,1997 and 9800094.6 filed on Jan. 6, 1998 on which United Kingdom Patent GB 2 321 055 was granted on Oct. 27, 1998.

BACKGROUND OF THE INVENTION

The present invention relates to grout that has a cellular structure when it hardens, and can be used for structural (i.e., load bearing) purposes.

There have been numerous prior inventions of grouts and similar compositions, but none that are equivalent to the instant invention. Most grouts in the prior art are used for void filling applications, such as filling cracks in rocks, stabilizing soils, spaces around the outside of tunnel rings, filling voids in prestressing of cable ducts, radiation absorbing barriers, etc. By contrast, the grout of the present invention is suitable for use as a load bearing foundation material. This is possible due to the inclusion of road planings with flexible coatings in the grout. Road planings tend to be hard particles surrounded by a flexible coating such as bitumen, asphalt or tar. Each road planing forms a cell with the adjacent grout. The road planings act as arrestors to the growth of microcracks, which are endemic in any cement bound material during shrinkage and thermal movements, and allow the material to be semiflexible, in contrast to the brittleness of conventional concrete.

U.S. Pat. No. 3,788,081, issued on Jan. 29,1974, to Arthur Sarkisian and Charles F. Murphy, discloses a grouting composition which sets into a stable structure. The use of road planings, as in the instant invention, is not disclosed. Furthermore, there is no suggestion that the composition disclosed can be used for load bearing foundations, as can the instant invention.

U.S. Pat. No. 4,268,316, issued on May 19, 1981, to Milton H. Wills, Jr., discloses a masonry cement prepared by blending portland cement, kiln dust, and fly ash. The instant invention is distinguishable in that it includes road planings, and can be used for load bearing foundations.

U.S. Pat. No. 5,728,209, issued on Mar. 17, 1998, to Jeffry Bury, David F. Factor and Zvi Grauer, discloses a unitized cement admixture, again without any disclosure of the use of road planings.

U.S. Pat. No. 5,776,244, issued on Jul. 7, 1998, to Ernst H. Ahrens, discloses an ultrafine cementitious grout. The instant invention has a cellular structure that would be absent in an ultrafine grout.

U.S. Pat. No. 5,921,707, issued on Jul. 13, 1999, to Raymond Caulton Owen, discloses a method of filling an excavated opening in the surface of a highway, including the use of excavated spoil that is mixed with grout using mechanical agitation and a foaming agent. The instant invention does not require the use of mechanical agitation or a foaming agent, and it can be used for large massive foundations and many other purposes besides filling in excavated openings in highways. The instant invention is further distinguishable, in that it uses road that are ground off the surface of the road, rather than excavated spoil that has been dug out of the hole (or a similar hole) that it is being used to refill. As an old highway may have had numerous repairs, the excavated spoil of Owen is likely to be a mixture of flexibly-coated broken material, including surface material similar to road planings, and uncoated concrete and natural aggregates, which when mixed with grout, will give variable and unpredictable results. In contrast, the instant invention uses only the flexibly coated road planings, with results that can be accurately predicted.

U.S. Pat. No. 5,968,257, issued on Oct. 19, 1999, to Ernst H. Ahrens, discloses another ultrafine cementitious grout.

U.S. Pat. No. 6,046,374, issued on Apr. 4, 2000, to Patrick j. Stephen, discloses a cellular grout radiation barrier, which requires a "radiation absorbing metal constituent" and a foaming agent, which are not required by the instant invention.

British Patent. No. 1,080,004, complete specification published on Aug. 23, 1967, to Leslie Bulmer, discloses a new or improved concrete and a process for the manufacture thereof, with no disclosure of the use of road planings, as in the instant invention.

European Patent Application No. 0 496 263A3, filed on Jan. 15, 1992, inventors Hans Klausmann and Ralf Klausmann, discloses a method for reusing tar-based building materials, in which said materials are used to make building blocks.

European Patent Application No. 0 628 522A1, filed on May 19, 1994, inventor Wolfgang Zimmermann, discloses concrete for road surfaces, including grains larger than eight millimeters taken from recycled road surfaces.

None of the above inventions and patents, taken either singly or in combination, is seen to describe the instant invention as claimed.

SUMMARY OF INVENTION

In the present invention, bitumen coated, asphalt coated, or tar coated road planings in a raw unprocessed state are added to a cement-pulverized fuel ash grout by either of two methods to produce a hardened structural cellular grout. The material is especially suitable for the construction of the sub-base to carriageways and footways and for trench reinstatements therein. Standard concrete mix admixtures can be used in the said grout to cater for specific site conditions.

Accordingly, it is a principal object of the invention to provide a new structural material.

It is another object of the invention to provide a use for recycled road planings.

It is a further object of the invention to provide a material suitable for load bearing foundations.

Still another object of the invention is to provide a material that can be used in the construction of highways, railway tracks, aircraft runways, car parks, ground slabs for buildings, etc.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION

The present invention is a hardened structural cellular grout and two methods of manufacturing such grout.

Bitumen coated, asphalt coated, or tar coated stone aggregates as single particles or agglomerated are produced automatically when the flexible wearing course, base or roadbase layer of a carriageway is cold planed prior to resurfacing. The coated stone aggregates or road planings are considered to be waste materials and are usually discarded. However, it would be advantageous if such road planings were to be reused since such reuse would enable finite reserves of natural stone aggregates to be conserved.

The present invention provides a use for road planings, and additionally and as importantly, a material that when hardened has useful load bearing structural properties, as well as mechanical and sound vibration attenuation properties, at a substantially lower cost than concrete of equivalent structural strength.

According to the present invention a hardened structural cellular grout is provided which comprises a mixture of a grout and raw unprocessed road planings (RURP). The grout includes cement pulverized fuel ash (PFA) and a liquid. The liquid contains water and may also contain admixtures such as accelerating admixtures, retarding admixtures, water-reducing admixtures, water-proofing admixtures, and the socalled superplasticizers as used in concrete mixes to suit specific site conditions.

The mix proportions of the preferred embodiments of the structural cellular grout are as follows:

For the grout the ratio of cement to PFA should be 0.1 to 3.0 by weight.

The ratio of water to solids should be 0.25 to 0.50 by weight.

Admixtures should be used as required by specific site conditions and in the proportions recommended by their manufacturers.

Added RURP should be 0.1% to 70% of the total weight of the mixture.

The present invention is distinguished from prior art in the reuse of road planings in that in the present invention no attempt is made to convert the RURP into aggregates which could be utilized in a conventional concrete, for example, by milling, crushing, coating removal, grading, etc.

The RURP are used beneficially in the mixture as follows:

1. To expand the grout to create a larger volume than with grout alone.

2. To create a cellular structure in the hardened material, having greater flexibility, and greater attenuation of mechanical and sound vibrations, than concrete or grout alone.

3. To reduce the growth of microcracks in the hardened material, by dissipating excessive local stresses in the hardened grout matrix, at the interface of the flexible coating of the planings with the grout.

The RURP are employed in the mixture essentially as void formers and are used in an unprocessed form deliberately. In the mixture the RURP convert the cement-PFA grout into a cellular material which, after hardening, has useful structural properties.

Unlike aggregates in concrete the RURP contribute negligible direct mechanical strength to the hardened structural cellular grout, due to the relatively soft coating of the RURP providing a cushion between the original aggregates of the RURP and the enveloping cementPFA grout.

For the hardened structural cellular grout, structural strength is almost entirely due to the number, size, quality and thickness of the cell walls formed from the cement-PFA grout. This contrasts with concrete where structural strength is greatly influenced by the direct mechanical strength, shape and interlock of the larger aggregates.

No foaming agents are required in making or using the grout of the present invention. Nor is any mechanical agitation required in making or using the grout. The present invention relies on the strength of the material resulting from the separation of the planings. The closer the planings, the less the strength of the hardened material. Therefor, any compaction of the mixed material from its original loosely packed state is to be avoided. For optimum structural strength and impermeability, the structural cellular grout mix should not be compacted by either mechanical or manual means, nor should a foaming agent be added, as this would reduce the thickness of the grout cell walls and increase their porosity. The curing of the material is similar to that for concrete.

The present invention provides a semi-flexible material that could be included in the standard specifications for the construction of foundations to highways, railway tracks, aircraft runways, car parks, and ground slabs for buildings. It is a material that can be manufactured on or off site with pre-determined characteristics, provided that the design mix details are adhered to, and it is not polluted with extraneous material such as broken concrete, bricks, stone, soil, etc. It is also a material that, because of the loose packed arrangement of the RURP in the material, permits itself to be broken out after it has hardened. The apparent mechanical strength disadvantage of the RURP in helping to achieve optimum structural strength of the hardened structural cellular grout is a distinct advantage where the material is required to be broken out in the future, for example, to enable underground apparatus to be installed. Unlike concrete, the hardened structural cellular grout can be broken out with light hand or light power tools, in a gradual, controlled manner, cell by cell.

According to the present invention there are provided two methods of manufacturing the hardened structural cellular grout, one of which will now be particularly described with reference to the following example:369 kilograms of PFA and 217 kilograms of cement are mixed together in a conventional concrete mixer and 264 kilograms of water is then added to form a grout. 1190 kilograms of RURP are then added to produce one cubic meter of structural cellular grout. After adequate mixing, the mixture is removed from the concrete mixer, placed in a void that receives the mixture, and allowed to harden.

An alternative method of producing the same hardened structural cellular grout will now be particularly described with reference to the following example:369kilograms of PFA and 217 kilograms of cement are mixed together in a conventional concrete mixer and 264 kilograms of water is then added to form a grout. The grout is then removed from the mixer and placed in a void to receive the grout in a layer about 75 millimeters thick. RURP at the rate of 1190 kilograms per cubic meter are then manually mixed into the grout using a rake or other suitable implement. However, no compaction or mechanical agitation is required. This procedure is then repeated until the full depth to be filled is achieved, and the material is then left to harden.

Hardened structural cellular grout produced by this latter method is especially suitable for use in trench reinstatements in highways where underground apparatus is present and/or small voids are required to be filled.

It is to be understood that the present invention is not limited to the sole embodiment described above, but encompasses any and all embodiments within the scope of the following claims.

What is claimed is:

1. A structural cellular grout comprising:
   cement pulverized fuel ash and road planings embedded in the grout, said road planings being produced by grinding the surface of the road;
   wherein the grout having a cellular structure is formed by mixing cement, pulverized fuel ash, a liquid, and the road planings, without the use of a foaming agent, and without the use of compaction or agitation by mechanical equipment, with the road planings and grout forming cells.

2. A structural cellular grout according to claim 1, wherein the road planings are raw and unprocessed.

3. A structural cellular grout according to claim 2, wherein the grout consists of cement, pulverized fuel ash, and a liquid.

4. A structural cellular grout according to claim 3, wherein the liquid consists of water and at least one substance selected from the group consisting of accelerating admixtures, retarding admixtures, water-reducing admixtures, water-proofing admixtures, and superplasticizers.

5. A structural cellular grout according to claim 1, wherein the grout has a ratio by weight of the cement to the pulverized fuel ash of from one-tenth to three.

6. A structural cellular grout according to claim 5, wherein the grout has a ratio by weight of solids to water of from two to four.

7. A structural cellular grout according to claim 6, wherein the weight of the raw unprocessed road planings is from one-thousandth to seven-tenths of the total combined weight of the grout and the raw unprocessed road planings.

8. A method of forming a structural cellular grout, comprising the steps of:
   mixing together, without the use of a foaming agent, compaction, or agitation by mechanical equipment, cement, pulverized fuel ash, and a liquid to form a grout;
   adding raw unprocessed road planings to the grout to form a mixture, said road planings being produced by grinding the surface of a road; and
   allowing the mixture to harden to form a cellular structure, with the road planings and the grout forming cells.

9. A method of forming a structural cellular grout according to claim 8, wherein the grout is placed into a space to be filled before the raw unprocessed road planings are added.

10. A method of forming a structural cellular grout according to claim 9, wherein:
    the liquid used to form the grout consists of water and at least one substance selected from the group consisting of accelerating admixtures, retarding admixtures, water-reducing admixtures, water-proofing admixture, and superplasticizers.

11. A method of forming a structural cellular grout according to claim 9, wherein:
    the grout has a ratio by weight of the cement to the pulverized fuel ash of from one-tenth to three;
    the grout has a ratio by weight of solids to water of from two to four; and
    the weight of the raw unprocessed road planings is from one-thousandth to seven-tenths of the total combined weight of the grout and the raw unprocessed road planings.

12. A method of forming a structural cellular grout according to claim 11,
    wherein the grout is formed in a cement mixer.

13. A method of forming a structural cellular grout according to claim 12,
    wherein the space is cavity in a roadway.

* * * * *

UNITED STATES PATENT AND TRADEMARK OFFICE
CERTIFICATE OF CORRECTION

PATENT NO. : 6,375,736 B1
DATED : April 23, 2002
INVENTOR(S) : Clive Michael Lovelace It is certified that error appears in the above-identified patent and that said Letters Patent is hereby corrected as shown below:

<u>Title page, Item [54] and Column 1, line 1,</u>
The title is corrected to read:
-- STRUCTURAL CELLULAR GROUT --

Signed and Sealed this

Twenty-fifth Day of June, 2002

Attest:

JAMES E. ROGAN
Attesting Officer        Director of the United States Patent and Trademark Office